No. 781,682. PATENTED FEB. 7, 1905.
C. SCHMIDT.
GEARING FOR MOTOR VEHICLES.
APPLICATION FILED NOV. 20, 1902.
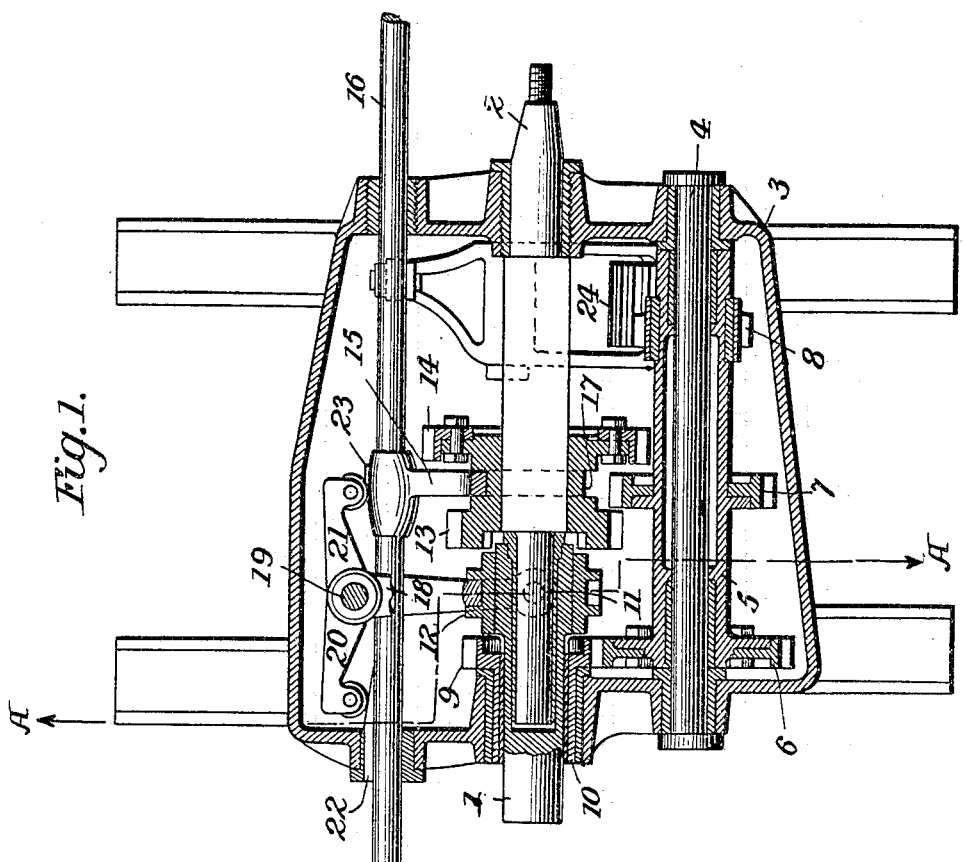
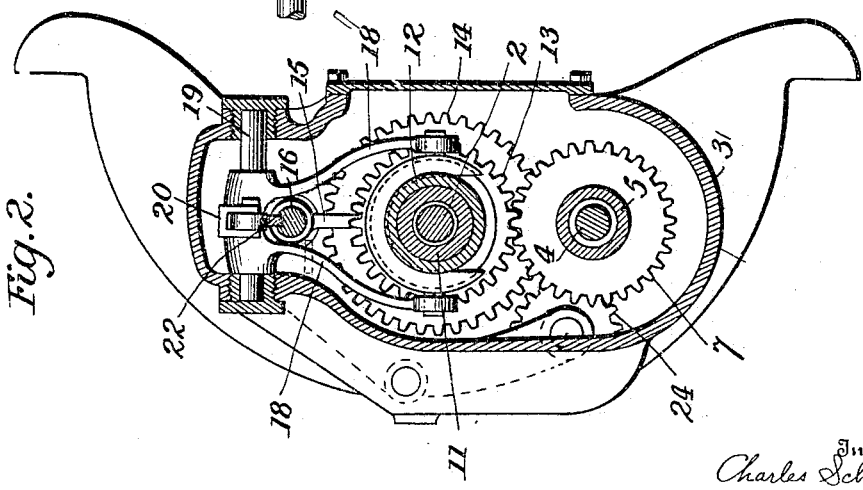
Witnesses
J. G. Hinkel.
Arthur L. Bryant.
Inventor
Charles Schmidt
By Watson & Watson
Attorneys No. 781,682. Patented February 7, 1905.

UNITED STATES PATENT OFFICE.

CHARLES SCHMIDT, OF WARREN, OHIO, ASSIGNOR TO PACKARD MOTOR CAR COMPANY, OF WARREN, OHIO, A CORPORATION OF WEST VIRGINIA.

GEARING FOR MOTOR-VEHICLES.

SPECIFICATION forming part of Letters Patent No. 781,682, dated February 7, 1905.

Application filed November 20, 1902. Serial No. 132,112.

*To all whom it may concern:*

Be it known that I, CHARLES SCHMIDT, a citizen of France, residing at Warren, in the county of Trumbull, State of Ohio, have invented certain new and useful Improvements in Gearing for Motor-Vehicles, of which the following is a specification.

This invention relates to transmission-gearing for motor-vehicles, and has for its object certain improvements in such gearing and particularly to obtain a direct connection without gearing between the motor-shaft and the variable-speed shaft when the motor-vehicle is running at its highest speed.

In the accompanying drawings, forming a part of this specification, Figure 1 is a longitudinal sectional view through the change-gears of a motor-vehicle and their casing, and Fig. 2 is a transverse sectional view about on the line A A of Fig. 1.

Referring to the drawings, 1 indicates the shaft, which will be termed the "motor-shaft" and which is driven directly by the motor or through the medium of a clutch, and 2 indicates a second shaft which is in line with the motor-shaft and from which the vehicle is driven. The shaft 2 may be termed the "driven" shaft. Mounted in the casing 3 and parallel with the aforesaid shaft is a fixed shaft 4, carrying a revoluble sleeve 5, upon which are fixed gears of three different diameters, marked, respectively, 6, 7, and 8. The gear 6 is in mesh with the gear 9, which is carried by a sleeve 10, loosely journaled on the motor-shaft. On an enlarged end 11 of the motor-shaft, which projects within the casing, is splined a clutch-block 12. This block is provided on one end with a series of teeth which interlock with inwardly-projecting teeth on the gear 9 when the clutch-block is thrown to the left, thus positively driving the gear 9 and the counter-shaft 5.

Two gears 13 14 of different sizes are rigidly connected together and arranged to turn with and slide on the driven shaft 2. The gear 13 is provided with inwardly-projecting teeth adapted to interlock positively with the teeth on the adjacent end of the clutch-block 12. When the clutch-block and the gear 13 are thus connected, it will be seen that the driven shaft is directly connected with and must run with the motor-shaft. The gears 13 14 are moved along the driven shaft 2 by means of an arm 15, carried by a sliding rod 16, which arm engages a circumferential groove 17 between the gears.

The clutch-block 12 is operated by a yoke 18, which rocks on a pivot 19, said yoke being rocked by means of arms 20 21, having rollers which coöperate with cams 22 23, carried by the rod 16. The operation of the clutch-block is as follows: When the rod 16 is moved to the right, the arm 20 is raised by the cam 22, throwing the clutch-block into engagement with the gear 9. The cam 22 has a long straight portion which holds the clutch-block in engagement with the gear, while the rod 16 is moved a considerable distance to the right to adjust the gears 13 14, as will be hereinafter explained. The cam 22 thus effects the engagement of the gear 9 with the motor-shaft, causing the counter-shaft 5 to rotate. While the parts are thus engaged, the gear 13 may be slid into engagement with the gear 7, imparting a middle speed to the driven shaft, or the gear 14 may be slid into engagement with the gear 8, imparting a slow speed to the driven shaft, or the gear 14 may be slid beyond the gear 8 and the backing-gear 24 thrown into engagement with both of them, thus imparting a slow backward movement to the driven shaft. When the rod 16 is moved to the left, the cam 23 throws the clutch 12 out of engagement with gear 9 and then into engagement with gear 13. There is a middle position of the clutch 12, which is shown in Fig. 1 of the drawings, in which the clutch is not in engagement with any of the gears and all of the gears are stationary. As the rod 16 reaches the limit of its movement to the left the clutch 12 and the gear 13 are interlocked and the motor-shaft thus connected directly and rigidly with the driven shaft, imparting the full speed of the motor to the latter shaft. When the gears 13 14 are in this position, they are out of engagement with the gears upon the counter-shaft, as will be apparent from an inspection of Fig. 1.

The mechanism above described provides in a simple manner for throwing the motor out of gear, for throwing the motor into direct positive connection with the driven shaft, and for two intermediate speeds, as well as for backing.

All of the mechanisms may be inclosed in a tight gear-casing, as shown.

Having described the invention, what is claimed is—

1. In a transmission-gearing for motor-vehicles, the combination of a motor-shaft, a driven shaft, a clutch-block arranged to turn with and slide on the motor-shaft, a counter-shaft provided with gears of different sizes, a clutch member geared to the counter-shaft and normally disconnected from the motor-shaft, gears mounted to slide on the driven shaft and to engage with the different-sized gears on the counter-shaft, a clutch member connected to said gears on the driven shaft, a rod adapted to slide said gears and their attached clutch member on the driven shaft, and means actuated by said rod for sliding the clutch-block on the motor-shaft.

2. In a transmission-gearing for motor-vehicles, the combination of a motor-shaft, a driven shaft, a clutch-block arranged to turn with and slide on the motor-shaft, a counter-shaft provided with different-sized gears, a clutch member for turning said counter-shaft, gears mounted to slide on the driven shaft and to engage the gears on the counter-shaft, a second clutch member connected to said gears, a lever for sliding the clutch-block on the motor-shaft to cause it to engage either of the said clutch members, and a rod connected to the gears on the driven shaft to slide them longitudinally thereof and provided with means for rocking said lever to adjust the clutch-block as desired.

3. In a transmission-gearing for motor-vehicles, the combination of the motor-shaft, the driven shaft in line with the motor-shaft, the change-gears splined on the driven shaft and provided with the clutch member, a clutch-block splined on the motor-shaft and provided with a corresponding clutch member, a counter-shaft, gearing on the counter-shaft adapted to connect the motor-shaft and change-gears, the rod for operating the change-gears, and the cams on said rod adapted to operate the clutch-block.

4. In a transmission-gearing for motor-vehicles, the combination with the motor-shaft and the gear loosely mounted thereon, of the counter-shaft driven from said gear, the clutch-block splined on the end of the motor-shaft and adapted to connect the motor-shaft with said gear, the driven shaft, gearing adapted to connect the counter and driven shafts, the three-armed lever for operating said clutch-block, and the rod provided with a cam for operating said three-armed lever, said cam having a straight portion for holding the clutch-block in engagement with the gear.

In testimony whereof I affix my signature in presence of two witnesses.

CHAS. SCHMIDT.

Witnesses:
    JAS. W. PACKARD,
    W. D. PACKARD.